(12) United States Patent  (10) Patent No.: US 7,789,344 B2
Cousin et al.                (45) Date of Patent:    Sep. 7, 2010

(54) AIRCRAFT ENGINE MOUNTING DEVICE ATTACHMENT ARRANGEMENT

(75) Inventors: Antoine Cousin, L'Union (FR); Jerome Cassagne, Toulouse (FR)

(73) Assignee: Airbus France, Toulouse (FR)

( * ) Notice: Subject to any disclaimer, the term of this patent is extended or adjusted under 35 U.S.C. 154(b) by 503 days.

(21) Appl. No.: 11/779,469

(22) Filed: Jul. 18, 2007

(65) Prior Publication Data
US 2008/0067286 A1    Mar. 20, 2008

(30) Foreign Application Priority Data
Sep. 20, 2006 (FR) .................................. 06 53848

(51) Int. Cl.
*B64C 1/16* (2006.01)
(52) U.S. Cl. ........................................ 244/54; 384/209
(58) Field of Classification Search .................. 244/54, 244/55; 248/554, 557; 384/906, 208, 209, 384/210, 206
See application file for complete search history.

(56) References Cited

U.S. PATENT DOCUMENTS 4,319,788 A * 3/1982 Hackman .................... 384/210
5,176,339 A   1/1993 Schmidt
5,303,880 A   4/1994 Cencula et al.
5,649,417 A * 7/1997 Hey ............................ 60/797
2003/0118399 A1 6/2003 Schilling et al.

FOREIGN PATENT DOCUMENTS

EP  357 504 A1   3/1990
EP  0 872 418 A2  10/1998
EP  1 535 838 A1   6/2005

* cited by examiner

Primary Examiner—Michael R Mansen
Assistant Examiner—Brian M O'Hara
(74) Attorney, Agent, or Firm—Oblon, Spivak, McClelland, Maier & Neustadt, L.L.P.

(57) ABSTRACT

An aircraft engine mounting device attachment arrangement includes a fitting perforated with two orifices, and two ball joints respectively housed in the orifices. The arrangement also includes two anti-rotation systems used to lock the ball joints in their orifices, the system including a main plate traversed by an external ring of the ball joint and including tappets cooperating with notches provided on the ring, the system including a main plate traversed by a main plate of the ball joint and including tappets cooperating with notches provided on the ring. In addition, the plates are connected rigidly to each other.

18 Claims, 8 Drawing Sheets

AIRCRAFT ENGINE MOUNTING DEVICE ATTACHMENT ARRANGEMENT

FIELD OF THE INVENTION

The present invention relates generally to an aircraft engine mounting device attachment arrangement and to such an aircraft engine mounting device, for example intended to be inserted between an aircraft wing unit and the engine concerned.

The invention also relates to an engine assembly comprising such a mounting device, and to an aircraft equipped with at least one such engine assembly.

The invention may be used on any type of aircraft equipped with turbojets and preferentially turboprops.

This type of mounting device, also referred to as "EMS" (or "Engine Mounting Structure"), may be used equally to suspend an engine below the aircraft wing unit, mount this engine above said wing unit or mount this engine at the rear of the aircraft fuselage.

STATE OF THE RELATED ART

On existing aircraft, in the case of turbojets, the mounting devices generally used comprise a caisson type rigid structure, i.e. formed by the assembly of lower and upper girders connected to each other by a plurality of transverse ribs. In addition, turboprop mounting devices generally consist of a rear under-wing caisson, extended by a lattice structure, to the front in the longitudinal direction of the turboprop.

In a known manner, these devices are particularly devised to enable the transmission to the wing unit of the static and dynamic stress generated by the engines, such as the weight, thrust, or the various dynamic stresses.

As such, in the mounting devices known in the prior art, the transmission of the stresses between same and the wing unit is conventionally carried out by a front attachment, a rear attachment, and an intermediate attachment, the thrust stresses generated by the engine possibly being for example absorbed by the front attachment. For this purpose, the front attachment comprises two groups of triangular shackles respectively positioned vertically on either end of the rigid structure. Each group of triangular shackles connects an attachment arrangement comprising a double orifice fitting attached to the upper girder of the rigid structure of the device, to a fitting attached to a front girder of the wing unit. The connections between the groups of triangular shackles and the fittings are provided by shafts oriented in a crosswise direction with respect to the mounting device, i.e. in an orthogonal direction both with respect to the vertical and the longitudinal axis of said mounting device.

More specifically, the attachment arrangement also comprises a first and a second ball joint respectively housed in the two orifices of the fitting attached to the rigid structure, also referred to as the primary structure, said ball joints being therefore respectively passed through by the two transverse connection shafts connecting said perforated fitting to the base of the triangular shackles.

Although this solution has proved to be relatively satisfactory due to the possibility of absorbing the thrust stresses using the two front half-attachments, it involves, however, a non-negligible drawback in the presence of friction between the external ring of each ball joint and its associated orifice. In fact, even though the ball joints are equipped with a clamping nut at one of their ends in order to enable a fixed assembly on the perforated fitting, the clamping applied via this nut does not prove to be sufficient to prevent the low-amplitude rotations of the external ring of each ball joint inside its associated orifice.

Such friction is naturally harmful for the service life of the parts forming the attachment arrangement, such that the design of this type of arrangement is clearly not fully optimised.

OBJECT OF THE INVENTION

Therefore, the main aim of the invention is to propose an aircraft engine mounting device attachment arrangement remedying the abovementioned drawbacks, relating to the embodiments of the prior art.

For this purpose, the invention relates to an aircraft engine mounting device attachment arrangement comprising a fitting perforated with a first and a second orifice with substantially parallel axes, and a first and a second ball joint respectively housed in the first and second orifices. According to the invention, the arrangement also comprises a first and a second anti-rotation system making it possible to lock the first and second ball joints respectively in their respective orifices, the first anti-rotation system comprising a main plate traversed by an external ring of the first ball joint and comprising tappets cooperating with notches provided on said external ring of the first ball joint, and the second anti-rotation system comprising a main plate traversed by an external ring of the second ball joint and comprising tappets cooperating with notches provided on said external ring of the second ball joint. In addition, the main plates of the first and second anti-rotation systems are connected rigidly to each other.

In this way, the proposed arrangement makes it possible advantageously to provide a simple and clever solution doing away with the risks of rotation of the ball joints in their associated orifices, which makes it possible to eliminate the inherent friction of such parasitic ball joint rotation movements.

In fact, the principle according to the present invention is based firstly on the presence of the first and second anti-rotation systems respectively coupled in rotation with the external rings of the two ball joints via the tappet/notch connections, and, secondly, on the rigid connection between the main plates of these anti-rotation systems. This rigid connection between the two main plates thus enables one of these main plates to fulfill the role of holding the other plate in position with respect to the perforated fitting, and vice versa, which advantageously avoids having to provide for each of the two plates imposing attachment means of said main plate on a fixed part with respect to the perforated fitting comprising the ball joints, such as for example the upper girder of the rigid structure of the associated mounting device.

Preferentially, the main plates of the first and second anti-rotation systems are consist of one part, therefore taking the form of a single plate traversed by the two ball joints, having for example a scalloped central portion connecting the two main plate orifices. In addition, it is intended that they are preferentially pressed against the perforated fitting, and arranged in the same plane.

According to a first and a second preferred embodiment of the present invention, the tappets comprised by the main plate of the first anti-rotation system consist of one part with said main plate, and the tappets comprised by the main plate of the second anti-rotation system consist of one part with said main plate.

In the first preferred embodiment, assembly means of the main plates on the perforated fitting are provided, said means remaining nevertheless very unimposing in that their role is restricted to preventing the main plates from being released from the perforated fitting, but is naturally in no way intended to be extended to the absorption of the stresses used to lock each ball joint in rotation inside its associated orifice.

In this case, the tappets comprised by the main plate of the first anti-rotation system are intended to be spaced circumferentially with respect to each other around a main plate orifice inside which they protrude, and the tappets comprised by the main plate of the second anti-rotation system are intended to be spaced circumferentially with respect to each other around a main plate orifice inside which they protrude. In this configuration of the first preferred embodiment, the tappets may therefore easily be housed in their respective notches provided on the external ring of the ball joints.

According to the second preferred embodiment, the main plate of the first anti-rotation system is pinched between a shoulder of the external ring of the first ball joint of the perforated fitting, and the main plate of the second anti-rotation system is pinched between a shoulder of the external ring of the second ball joint of the perforated fitting. In this way, it is no longer necessary to provide assembly means of the main plates as in the first preferred embodiment, as these plates are held in place with respect to the perforated fitting by the abovementioned pinching. This makes it possible to simplify the design of the two anti-rotation systems, which may then consist of a single part made of one piece and defining the two main perforated plates and their respective tappets.

In this second preferred embodiment where the assembly of the main plates is therefore carried out by pinching and preferentially without the use of ancillary assembly means, in this case, it is preferentially ensured that the tappets comprised by the main plate of the first anti-rotation system are spaced circumferentially with respect to each other around a main plate orifice, and protrude from an external surface of this main plate opposite an internal surface of same pressing against the perforated fitting, and that the tappets comprised by the main plate of the second anti-rotation system are spaced circumferentially with respect to each other around a main plate orifice, and protrude from an external surface of said main plate opposite an internal surface of same pressing against the perforated fitting. As a result, this solution is then perfectly suitable to have the tappets cooperate with notches produced on the periphery of the external ring of the ball joint in question, and open in the direction of an axis of the ball joint corresponding to the direction of the insertion of this ball joint in its associated orifice. In fact, this makes it possible to obtain an automatic engagement of the tappets in their associated notches, during the positioning of the ball joint in its orifice, this positioning operation having naturally been preceded by a positioning against the perforated plate of the main plates comprising the tappets.

According to a third preferred embodiment of the present invention, the first anti-rotation system also comprises a secondary plate mounted in a fixed manner on the main plate, the tappets consisting of one part with the secondary plate and spaced circumferentially with respect to each other around a secondary plate orifice inside which they protrude, and the second anti-rotation system also comprises a secondary plate mounted in a fixed manner on the main plate, the tappets consisting of one part with the secondary plate and spaced circumferentially with respect to each other around a secondary plate orifice inside which they protrude.

In such a case, it is possible to provide for the main plate of the first anti-rotation system being pinched between a shoulder of the external ring of the first ball joint and the perforated fitting, and the main plate of the second anti-rotation system being pinched between a shoulder of the external ring of the second ball joint and the perforated fitting.

In this way, in this third preferred embodiment, no part of the first and second anti-rotation systems needs to be assembled using ancillary assembly means on the perforated fittings or on a fixed part with respect thereto. At the same time, this makes it possible to simplify the assembly thereof, and therefore reduce the time and cost associated therewith.

Preferentially, for all the preferred embodiments, each of the first and second ball joints comprises an external ring equipped with a shoulder at one of its ends and a thread cooperating with a clamping nut at the other end, the first and second anti-rotation systems cooperating respectively with the shoulder of their associated ball joint.

The advantage resulting from such a configuration is that the tappets can then cooperate with notches initially provided on the shoulder of the external ring to be engaged by a rotation locking tool during the assembly of the ball joint in its orifice, which therefore does not require any change of the design of the existing ball joints. As such, by positioning the anti-rotation systems prior to the positioning of the ball joints, it is no longer necessary to provide for such a rotation locking tool during clamping of the nut, given that the rotation locking function of each of two external rings is specifically carried out by these anti-rotation systems.

However, it would alternatively have been possible to mount the first and second anti-rotation systems on the other end of the external ring of the ball joints, i.e. the threaded end opposite that incorporating the shoulder, without leaving the scope of the invention.

In this respect, according to a fourth embodiment of the present invention, each of the first and second ball joints comprises an external ring equipped with a shoulder at one of its ends and a thread cooperating with a clamping nut at the other end, the main plates of the first and second anti-rotation systems each being pinched between the perforated fitting and one of the clamping nuts. In this way, no part of the first and second anti-rotation systems needs to be assembled using ancillary assembly means on the perforated fittings or on a fixed part with respect thereto. At the same time, this makes it possible to simplify their assembly, and therefore reduce the time and cost associated therewith.

In addition, in this fourth embodiment, the tappets of the first and second anti-rotation systems therefore cooperate with notches provided on the threaded end of the external rings of the ball joints.

For this purpose, preferably, the tappets comprised by the main plate of the first anti-rotation system are spaced circumferentially with respect to each other around a main plate orifice inside which they protrude, and the tappets comprised by the main plate of the second anti-rotation system are spaced circumferentially with respect to each other around a main plate orifice inside which they protrude.

In this configuration, it is possible to provide that the main plate of the first anti-rotation system comprises additional tappets or tabs spaced circumferentially with respect to each other around the main plate orifice from which they protrude radially outwards, and that the main plate of the second anti-rotation system comprises additional tappets or tabs spaced circumferentially with respect to the each other around the main plate orifice from which they protrude radially outwards, said additional tappets cooperating respectively with notches provided on the clamping nuts in order to lock same in rotation.

As a result, with such an arrangement, the single part consisting preferentially of one piece defining the first and second anti-rotation systems and the additional tappets or tabs makes it possible simultaneously to lock in rotation the two external rings of the ball joints and prevent the loosening of the two clamping nuts cooperating with said two external ball joint rings.

The invention also relates to an engine mounting device on an aircraft structure such as a wing unit or a rear part of the fuselage, the device comprising a rigid structure and mounting means of the rigid structure on the structure, the mounting means comprising a plurality of attachments wherein at least one comprises at least one arrangement such as that described above.

Preferentially, said at least one attachment comprising at least one arrangement also comprises at least one triangular shackle mounted on said arrangement, via two shafts passing through the first and second ball joints respectively.

In addition, the invention also relates to an engine assembly comprising an engine such as a turboprop and a mounting device of said engine, the mounting device being such as that described above.

Finally, the invention also relates to an aircraft comprising at least one engine assembly such as that specified above, assembled on a wing or on a rear part of the fuselage of said aircraft.

Other advantages and characteristics of the invention will emerge in the non-exhaustive detailed description below.

BRIEF DESCRIPTION OF THE DRAWINGS

This description will be given with respect to the appended figures wherein.

DETAILED DESCRIPTION OF PREFERRED EMBODIMENTS

Figure 1:
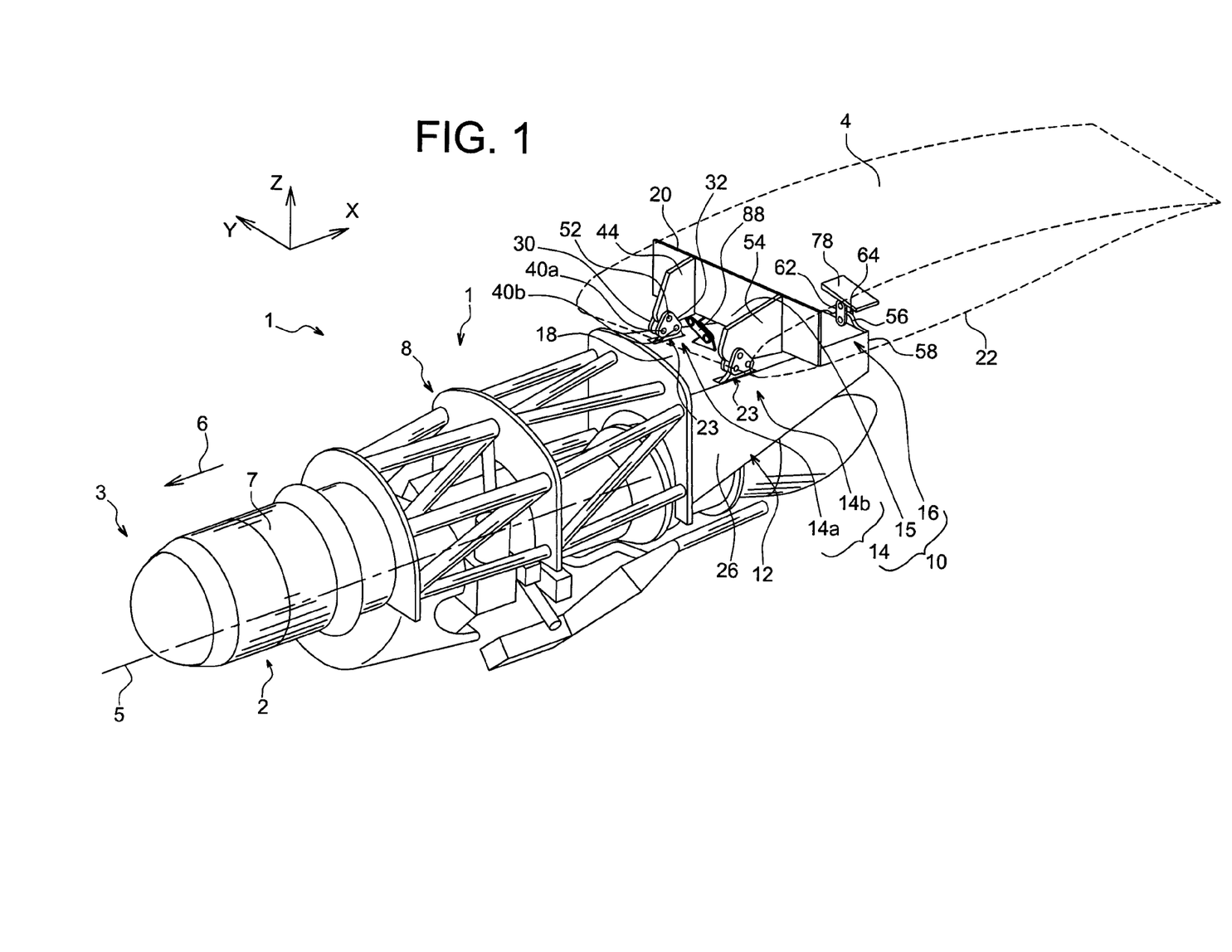
FIG. 1 represents a perspective view of an aircraft engine assembly according to the present invention.

With reference firstly to FIG. 1, an aircraft engine assembly 3 according to the present invention can be seen, said assembly 3 comprising a mounting device 1 intended to suspend a turboprop 2 under an aircraft wing only represented schematically for clarity reasons, and designated generally by the numeric reference 4. It is noted that the mounting device 1 represented in this FIG. 1 is suitable for cooperating with a turboprop 2 forming an integral part of the assembly 3, but it may naturally consist of a device devised to suspend any other type of engine, such as a turbojet, without leaving the scope of the invention.

As an indication, it is noted that the assembly 3 is intended to be surrounded by a pod (not shown), and that the mounting device 1 comprises a series of engine attachments (not shown) used to suspend the turboprop 2 under the mounting device, and more specifically under the rigid structure thereof.

In the entire description below, by convention, X refers to the direction parallel to a longitudinal axis 5 of the engine 2 which is also comparable to the longitudinal direction of the mounting device 1, Y to the direction oriented crosswise with respect to the aircraft and also comparable to the transverse direction of the mounting device 1 and the engine 2, and Z to the vertical direction or the height, these three directions being orthogonal with respect to each other. It is specified that the longitudinal axis 5 of the engine 2 is to be taken to be the longitudinal axis of the engine casing, and not the longitudinal axis of its propeller 7 (the blades of which are not shown).

In addition, the terms "front" and "rear" should be taken into consideration with respect to the direction of forward motion of the aircraft encountered following the thrust applied by the engines 2, this direction being represented schematically by the arrow 6.

In FIG. 1, it can be seen that only one rigid structure 8 of the mounting device 1 has been represented, accompanied by mounting means 10 of said rigid structure 8 under the wing unit 4 of the aircraft, said means 10 naturally belonging to the mounting device 1. The other constituent parts of this device 1 not shown, such as the secondary structure ensuring the segregation and holding in place of the systems while supporting streamline filleting, are conventional parts identical or similar to those encountered in the prior art and known to those skilled in the art. As a result, no detailed description will be made thereof.

Similarly, as the rigid structure 8 is similar to those encountered in the devices according to the prior art, and displaying in any case a specific and different design according to the type of engine to be suspended, it will not be described in more detail as a result.

However, the mounting means 10, located overall to the rear of the rigid structure 8, and more specifically at an under-wing caisson 12 in the case shown of a rigid turboprop structure, are specific to the present invention, and therefore will be presented in detail below.

As a general rule, the attachment means 10 consist of a front attachment 14, an intermediate attachment 15 and a rear attachment 16, the intermediate attachment 15 being positioned between the front and rear attachments 14, 16. As will be explained in detail below, the front attachment 14 connects an upper girder 18 of the under-wing caisson 12 of the rigid structure 8, to a front vertical girder 20 forming an integral part of the structure of the wing 4 and extending substantially along a main longitudinal direction or wing span (not shown) of said wing 4. The intermediate attachment 15 also connects the upper girder 18 of the under-wing caisson 12 to the front vertical girder 20 of the wing 4.

In addition, the rear attachment 16 connects a rear end of the upper girder 18 of the under-wing caisson 12, to a horizontal rib (not shown) substantially perpendicular to a main wing unit girder (not shown) forming an integral part of the structure of the wing 4.

Figure 2:
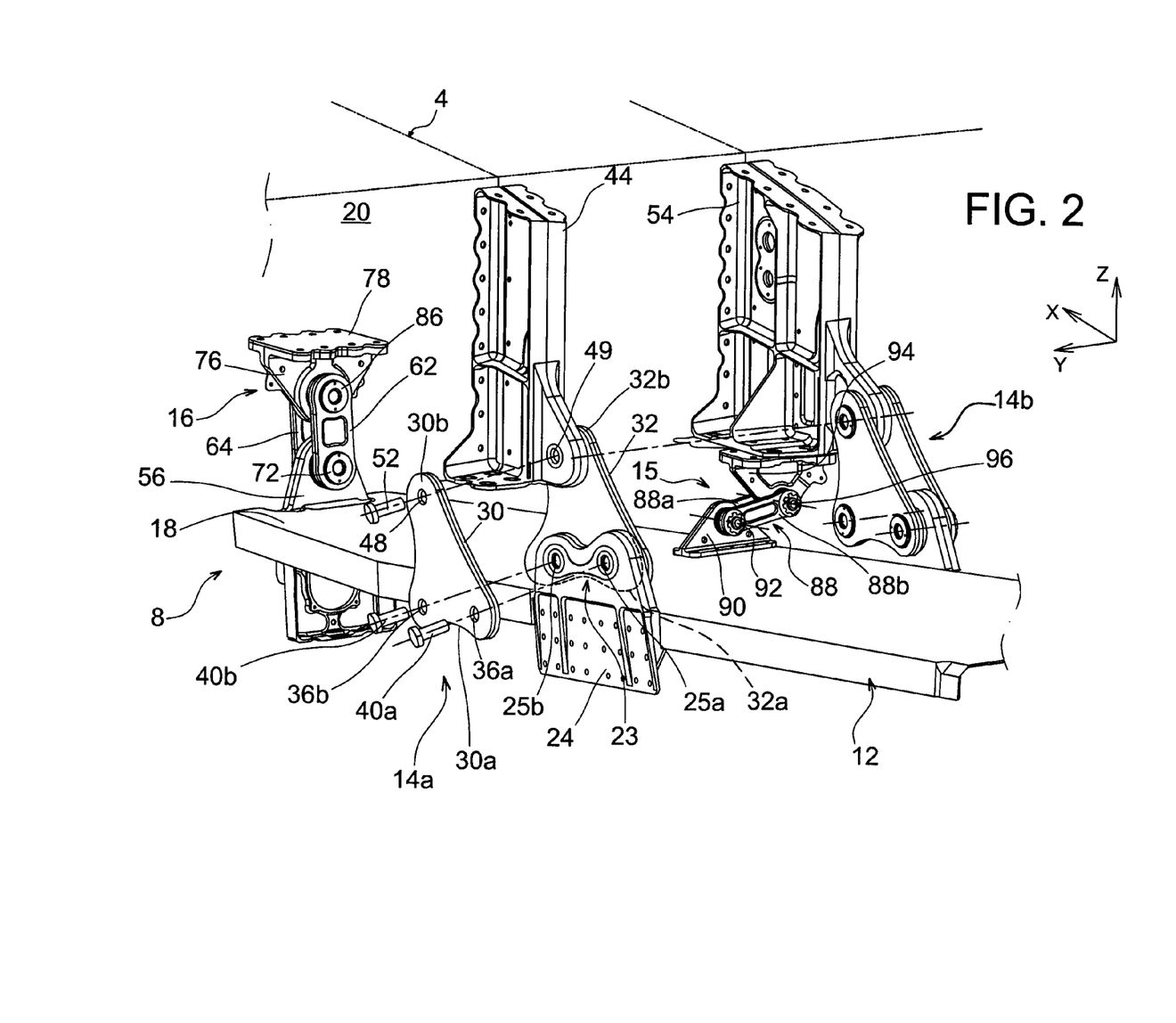
FIG. 2 represents an enlarged perspective view with respect to that in FIG. 1, showing in more detail the mounting means of the rigid structure of the mounting device belonging to the engine assembly shown in FIG. 1.

As can be seen in FIGS. 1 and 2, the front attachment 14 in fact consists of two half-attachments 14a and 14b, substantially identical, arranged at either end of a vertical plane (not shown) passing through the longitudinal axis 5 of the engine, and arranged preferentially symmetrically with respect to said plane. For this reason, only one of both half-attachments 14*a*, 14*b* will be detailed below.

In this way, it can be seen that the half-attachment 14*a* firstly comprises an attachment arrangement 23 essentially comprising a fitting 24, preferentially a double fitting, attached to the girder 18 of the under-wing caisson 12. This fitting 24 extends substantially in a vertical plane oriented along the direction X, i.e. along a plane XZ, practically in the prolongation of a side panel 26 of the under-wing caisson 12. In addition, it is perforated with two through holes of parallel axes substantially oriented in a transverse direction Y of the aircraft, and each receiving a ball joint, respectively a first ball joint 25*a* and a second ball joint 25*b* as will be detailed subsequently with reference to FIG. 3. As an indication, it is noted that the ball joints 25*a*, 25*b* form an integral part of the attachment arrangement 23 of the front half-attachment 14*a*.

Two triangular shackles 30 and 32, preferentially identical and taking roughly the shape of an equilateral triangle, are respectively arranged on either side of this fitting 24, also substantially in the planes XZ. In this way, the external shackle 30 and the internal shackle 32 together form a pair of triangular shackles, wherein the shackles 30, 32 are parallel with each other. As such, it is specified that the pair of triangular shackles could also consist of double shackles, without leaving the scope of the invention.

In this preferred embodiment of the present invention, the external shackle 30 is arranged such that one of its bases 30*a* is mounted on the fitting 24 of the arrangement 23, this base 30*a* being oriented substantially in the direction X. In this way, it can be understood that the shackle 30 is positioned such that it extends vertically upwards along the direction Z, from its base 30*a*, to a vertex 30*b* opposite this base 30*a*.

In this way, in the vicinity of each of the two vertexes (not referenced) associated with this base 30*a*, a through hole 36*a*, 36*b* is produced, oriented along the direction Y. In the same way, the internal shackle 32 is arranged in the same way as that of the external shackle 30, i.e. one of its bases 32*a* is mounted on the fitting 24, and this base 32*a* is oriented substantially along the direction X. As a result, in this case also, a through hole (not visible in FIGS. 1 and 2) oriented along the direction Y is produced, in the vicinity of each of the two vertexes (not referenced) associated with this base 32*a*.

To provide the connection between the pair of shackles and the fitting 24, the half-attachment 14*a* comprises two shafts 40*a*, 40*b* substantially oriented along the direction Y, and arranged in the same horizontal plane XY. In fact, the front shaft 40*a*, preferentially a double shaft, passes successively through the through hole 36*a* of the external triangular shackle 30, one of the two through holes produced in the fitting 24 and more specifically the ball joint 25*a* housed in this orifice, along with one of the two through holes of the internal triangular shackle 32. Similarly, the rear shaft 40*b*, preferentially also a double shaft, passes successively through the through hole 36*b* of the external triangular shackle 30, the other of the two through holes produced in the fitting 24 and more specifically the ball joint 25*b* housed in this orifice, and the other of the two through holes of the internal triangular shackle 32.

Moreover, the half-attachment 14*a* is fitted with another fitting 44 oriented in a vertical plane XZ and taking the form of a rib of the structure of the wing 4, said rib 54 being attached to the girder 20 as is clearly visible in FIGS. 1 and 2. In a lower front part of said fitting 44 oriented vertically in the direction X, it is perforated with a single through hole oriented along a direction Y of the aircraft, and receiving a ball joint 49.

To attach the pair of triangular shackles onto said fitting 44, the external shackle 30 comprises a through hole 48 oriented along the transverse direction Y, said hole 48 being produced in the vicinity of the vertex 30*b* opposite the abovementioned base 30*a*. Similarly, the internal shackle 32 comprises a through hole (not visible in FIGS. 1 and 2) oriented along the transverse direction Y, said hole 50 being produced in the vicinity of a vertex 32*b*. With such an arrangement, an upper shaft 52 oriented along the direction Y, arranged above the axes 40*a* and 40*b* and being preferentially double, may then provide the connection between the pair of shackles and the fitting 44, by passing successively through the through hole 48 of the external triangular shackle 30, the through hole of the fitting 44 and more specifically the ball joint 49 housed in this hole, and the through hole of the internal triangular shackle 32.

As mentioned above, the half-attachment 14*b* will not be described in more detail, in that only the length along the direction X of its fitting 54 inserted between the girder 20 and the pair of triangular shackles is different with respect to the length along the direction X of the fitting 44 of the half-attachment 14*a*. Naturally, this is explained by the positioning of the girder 20 of the wing 4, which is located in an inclined vertical plane with respect to a plane YZ.

Again with reference jointly to FIGS. 1 and 2, it can be seen that the rear attachment 16 comprises a fitting 56 attached to a rear end of the girder 18 of the under-wing caisson 12. This fitting 56 extends in a vertical plane oriented along the direction Y, i.e. in a plane YZ. This fitting 56 is perforated with a through hole cutting diametrically through the vertical plane passing through the abovementioned longitudinal axis 5, and oriented along the direction X of the aircraft. Two single shackles 62 and 64, preferentially identical and roughly taking the form of a rectangle with rounded widths, are respectively arranged at either end of this fitting 56, also in planes YZ.

In the vicinity of a lower end (not referenced) of the front shackle 62, a through hole oriented along the direction X is produced. Similarly, the rear shackle 64 is arranged identically to that of the front shackle 62, i.e. along the vertical direction Z. Here again, a through hole oriented along the direction X is produced, in the vicinity of the lower end of said rear shackle 64.

To provide the connection between the pair of shackles and the fitting 56, the rear attachment 16 comprises a lower shaft 72 oriented along the direction X. This lower shaft 72, preferentially a double shaft, then phases successively through the through hole of the front shackle 62, the through hole produced in the fitting 56, and the through hole of the rear shackle 64.

Moreover, the rear shackle 16 is provided with another fitting 76 oriented overall in a vertical plane YZ and extending upwards by a horizontal plate 78, said plate 78 being attached to the horizontal rib substantially perpendicular to the main girder of the wing 4. As a result, the fitting 76 passes through a lower wing surface coating 22 of the wing 4, or is mounted on said coating 22 in conjunction with the horizontal rib.

In a lower part, said fitting 76 is perforated with a single through hole, oriented along the direction X of the aircraft. To attach the pair of shackles on said fitting 76, the front shackle 62 comprises a through hole oriented along the direction X, said hole 82 being produced in the vicinity of an upper end (not referenced) of said front shackle 62. Similarly, the rear shackle 64 comprises a through hole oriented along the direction X, said hole 84 being produced in the vicinity of an upper end (not referenced) of said rear shackle 64. With such an arrangement, an upper shaft 86, arranged above the shaft 72 and being preferentially a double shaft may then provide the connection between the pair of shackles and the fitting 76, by passing successively through the through hole of the front shackle 62, the through hole of the fitting 76, and the through hole of the rear shackle 64.

The intermediate attachment 15 in turn essentially comprises a connecting rod 88 absorbing the stresses applied along the direction Y, said connection rod 88 being located in a vertical plane YZ, and preferentially arranged along said transverse direction Y or slightly inclined with respect to said direction Y. As represented in FIG. 2, this connecting rod/shackle 88 may be duplicated, in order to provide a backup function in the event of the failure of either one, this function being more commonly referred to as "Fail Safe".

In addition, the intermediate attachment 15 is equipped with a lower fitting 90 attached to the girder 18 of the underwing caisson 12, the fitting 90 being perforated with a through hole (not referenced) oriented along the direction X. A first end 88a of the connecting rod 88 is thus mounted in a hinged manner on said fitting 90, via a shaft 92 oriented along the direction X. In addition, the intermediate attachment 15 is equipped with an upper fitting 94 attached to the girder 20 of the structure of the wing 4, the fitting 94 being also perforated with a through hole (not referenced) oriented in the direction X. A second end 88b of the connecting rod 88 is then mounted in a hinged manner on said fitting 94, via a shaft 96 oriented along the direction X.

In this isostatic arrangement of the present invention, the longitudinal stresses (thrust, reversing gears) are transmitted via the front attachment 14. The transverse stresses are transmitted by the intermediate attachment 15, while the stresses along the vertical direction simultaneously pass through the front attachment 14 and the rear attachment 16. It is noted that with such a configuration, the longitudinal stresses transit directly via the ribs 44 and 54 of the structure of the wing 4, these ribs 44 and 54 being located generally to the rear with respect to the half-attachments 14a, 14b.

Moreover, the moment along the longitudinal axis is absorbed in the vertical direction by both half-attachments 14a, 14b of the front attachment 14, and the moment along the transverse axis is also absorbed in the vertical direction by the assembly formed by the front 14 and rear attachments 16. Finally, the moment along the vertical axis is absorbed in the longitudinal direction by both half-attachments 14a, 14b of the front attachment 14.

Figure 3:
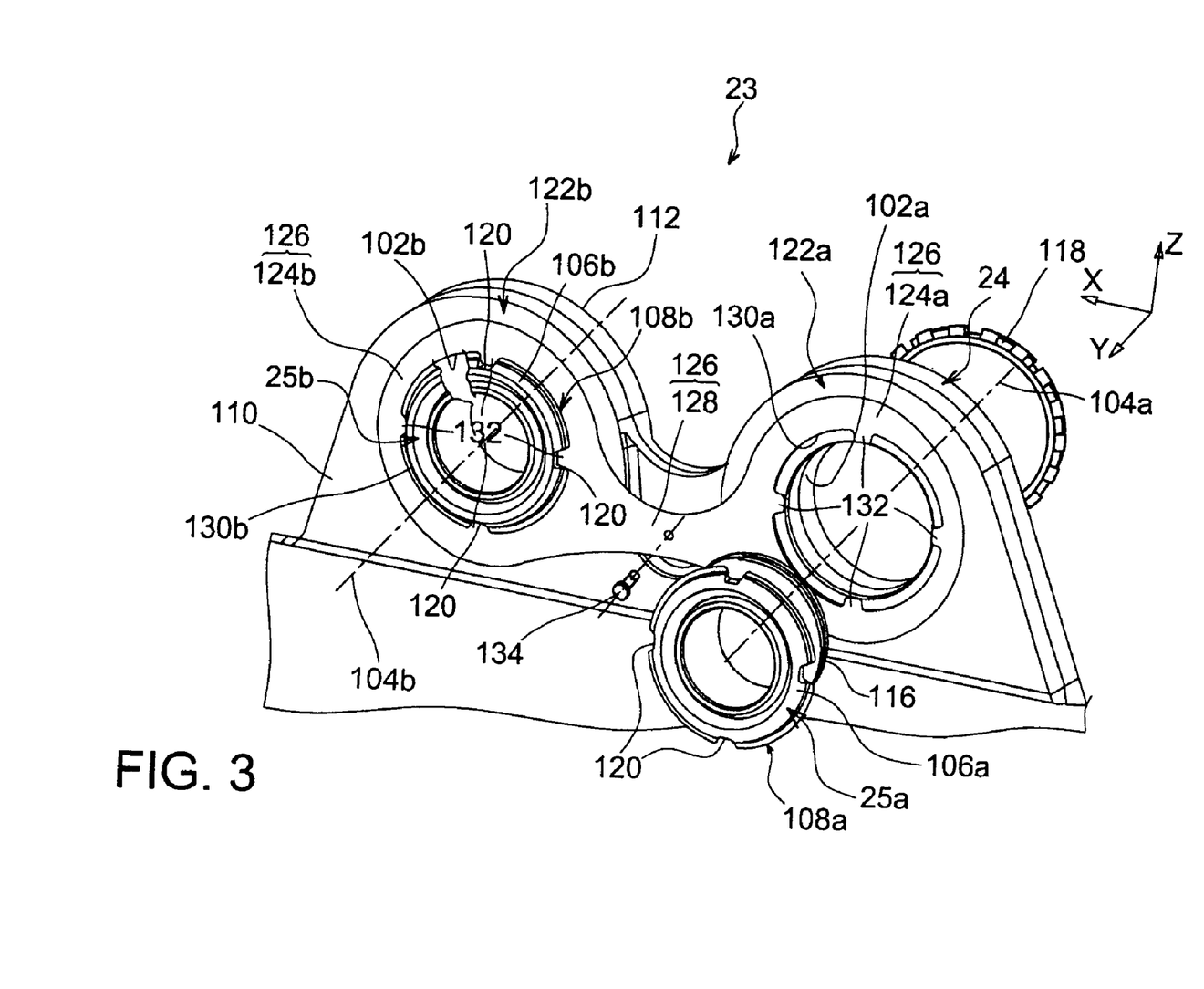
FIG. 3 represents a partially exploded enlarged perspective view of an attachment arrangement belonging to an attachment of the mounting means illustrated in FIG. 2, the attachment arrangement being in the form of a first preferred embodiment of the present invention.

With reference to FIG. 3, the attachment arrangement 23 illustrated in FIG. 2 can be seen in detail, said arrangement being in the form of a first preferred embodiment of the present invention, and being therefore intended to be used in the composition of each of the two front half-attachments 14a, 14b.

In this way, the arrangement 23 comprises the fitting 24 perforated at the front with a first orifice 102a of an axis 104a parallel with the direction Y, and perforated at the rear with a second orifice 102b of an axis 104b also parallel with the direction Y. As mentioned above, the orifice 102a is traversed by the first ball joint 25a, such that a shoulder 106a provided at one of the ends of an external ring 108a of said ball joint 25a is pressing against an external lateral surface 110 of the perforated fitting 24. More specifically with reference to FIG. 4 detailing the ball joint 25a, which is moreover identical to the ball joint 25b, this ball joint actually comprises the external ring 108a housing an internal ring 114, the external ring 108a comprising at the end opposite that comprising the shoulder 106a, a thread 116 produced to receive a clamping nut 118. As is known to those skilled in the art, conventional anti-rotation means coupled with the nut 118 are preferentially provided, so that said nut is not loosened, said clamping nut 118 being intended to rest against an internal lateral surface 112 of the perforated fitting 24.

Figure 4:
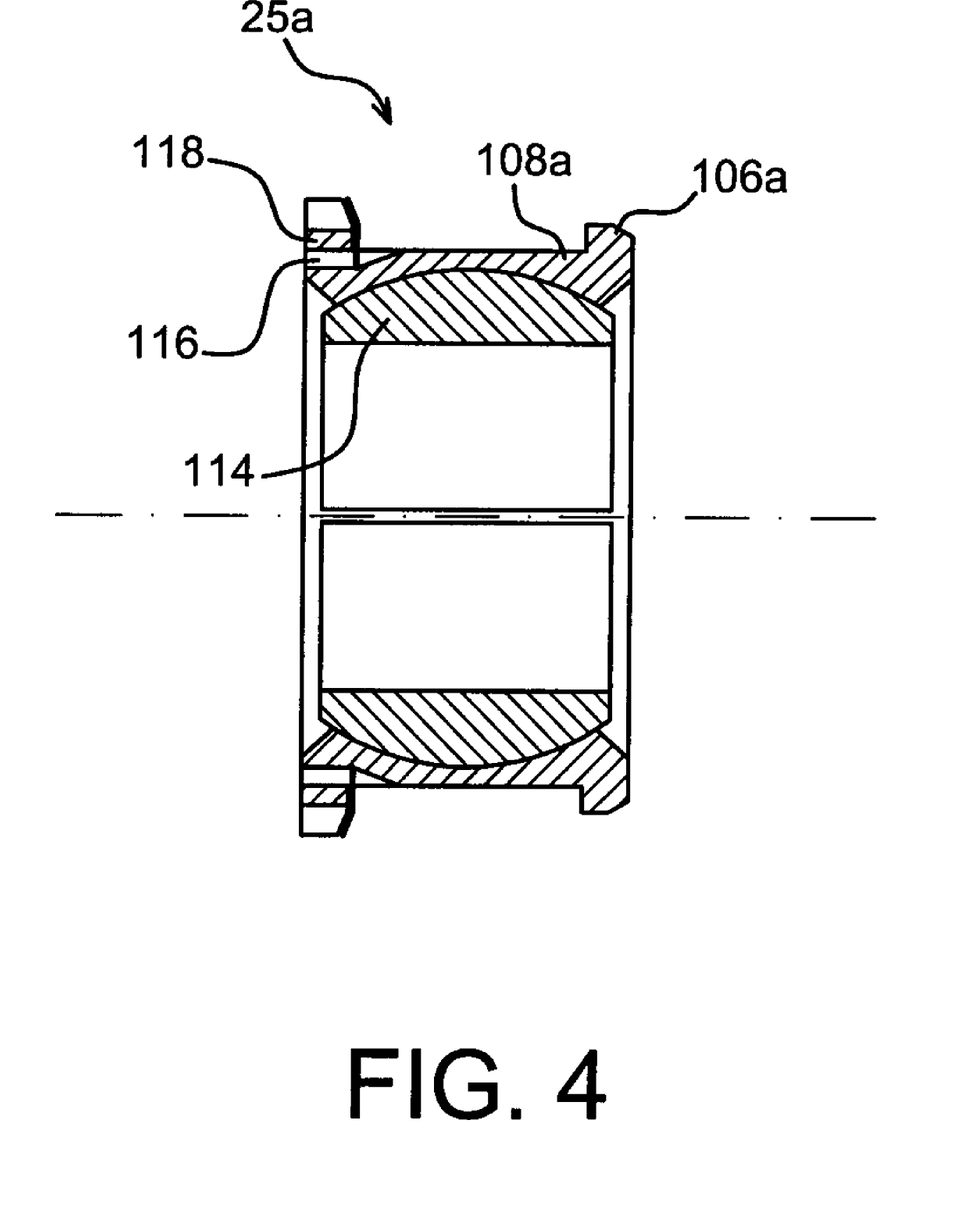
FIG. 4 illustrates a longitudinal cross-section view of one of the two ball joints fitted in the attachment arrangement illustrated in FIG. 3.

Similarly, the orifice 102b is traversed by the second ball joint 25b, such that a shoulder 106b provided at one of the ends of an external ring 108b of said ball joint 25b is resting against the external lateral surface 110 of the perforated fitting 24, a clamping nut (not visible) being in turn mounted on the other end of the ring 108b, to rest against the internal lateral surface 112.

As can be seen more clearly in FIG. 3, the external ring 108a, 108b of each of the two ball joints 25a, 25b is equipped with notches 120 at its shoulder 106a, 106b, these notches being spaced circumferentially with respect to each other around the axis 104a, 104b of the corresponding orifice 102a, 102b. As an indication and as represented, these notches 120 are provided in a number of four on the same shoulder, and correspond to the notches generally engaged by a rotation locking tool during the assembly of the ball joint in its orifice. The regularly spaced notches 120 are open in the direction Y also corresponding to the direction of insertion of the ball joint in its associated orifice, but also open radially outwards. In this respect, it is noted that the opening of the notches 120 in the direction Y may be provided in both directions or only in one direction, i.e. that making it possible to obtain an automatic engagement of the tappets in their associated notches during the positioning of the ball joint in its orifice, as described below.

In fact, the attachment arrangement 23 also comprises a first anti-rotation system 122a and a second anti-rotation system 122b used to lock the ball joints 25a, 25b respectively in their respective orifices 102a, 102b.

Overall, the first system 122a comprises a main plate 124a pressing against the external lateral surface 110 and therefore located substantially in a plane XZ, said plate 124a comprising an orifice 130a centred on the axis 104a and traversed by the external ring 108a of the ball joint 25a. In addition, this plate of a substantially circular shape and of a thickness of approximately 2 mm is preferentially made of titanium.

One of the specificities of the present invention lies in the fact that it comprises tappets 132 each cooperating with one of the notches 120 provided on the external ring 108a. More specifically, in this first preferred embodiment of the present invention, the four tappets 132 comprised by the plate 124a are made of one piece therewith and arranged so as to be spaced circumferentially with respect to each other around the orifice 130a wherein they protrude, radially inwards.

Similarly, the second system 122b comprises a main plate 124b pressing against the external lateral surface 110 and located in the same plane XZ as that of the plate 124a, said plate 124b comprising an orifice 130b centred on the axis 104b and traversed by the external ring 108b of the ball joint 25b. In addition, in this case also, the plate of substantially circular shape and of a thickness of approximately 2 mm is preferentially made of titanium.

Moreover, it comprises tappets 132 each cooperating with one of the notches 120 provided on the external ring 108b, the four tappets 132 consisting of one piece with the plate 124b and arranged so as to be spaced circumferentially with respect to each other around the orifice 130b inside which they protrude, radially inwards.

In this first preferred embodiment, the main plates 124a, 124b consist of one piece and are joined by an intermediate portion 128 of reduced cross-section. In this way, a part 126 is provided consisting of a single piece incorporating the two plates 124a, 124b, their tappets 132, and the intermediate joining portion 128, said part roughly taking the shape of a figure of eight along the direction X, pressing against the external lateral surface 110 of the fitting 24.

It is understood that the arrangement 23 is assembled firstly by positioning the single part 126 correctly against the perforated fitting 24, so as to align the plate orifices 130a, 130b respectively with the orifices 102a, 102b of the fitting 24. In this respect, to perform and retain this positioning, it is possible to use assembly means of the part 126 on the perforated fitting 24, said means possibly taking the form of a simple bolt 134 passing for example through the intermediate portion 128 as illustrated in FIG. 3.

The ball joints 25a, 25b are then inserted into their respective housings along the direction Y, with their external rings 108a, 108b successively passing through the plate orifices 130a, 130b and the fitting orifices 102a, 102b. This insertion is performed with an angular alignment of each of the external rings 108a, 108b suitable for obtaining an automatic engagement of the tappets 132 in their respective notches 120 provided on the shoulder 106a, 106b of the ring concerned.

Finally, when the shoulder 106a, 106b has come into contact with the external lateral surface 110, the clamping nut 118 is screwed onto the opposite end of the ring 108a, 108b, so as to complete the assembly of the attachment arrangement 23. The screwing may be performed without it being necessary to have the shoulder 106a, 106b cooperate with a rotation locking tool of the corresponding external ring 108a, 108b with respect to the perforated fitting 24, given that this function is now fulfilled entirely by the part 126.

Figure 5:
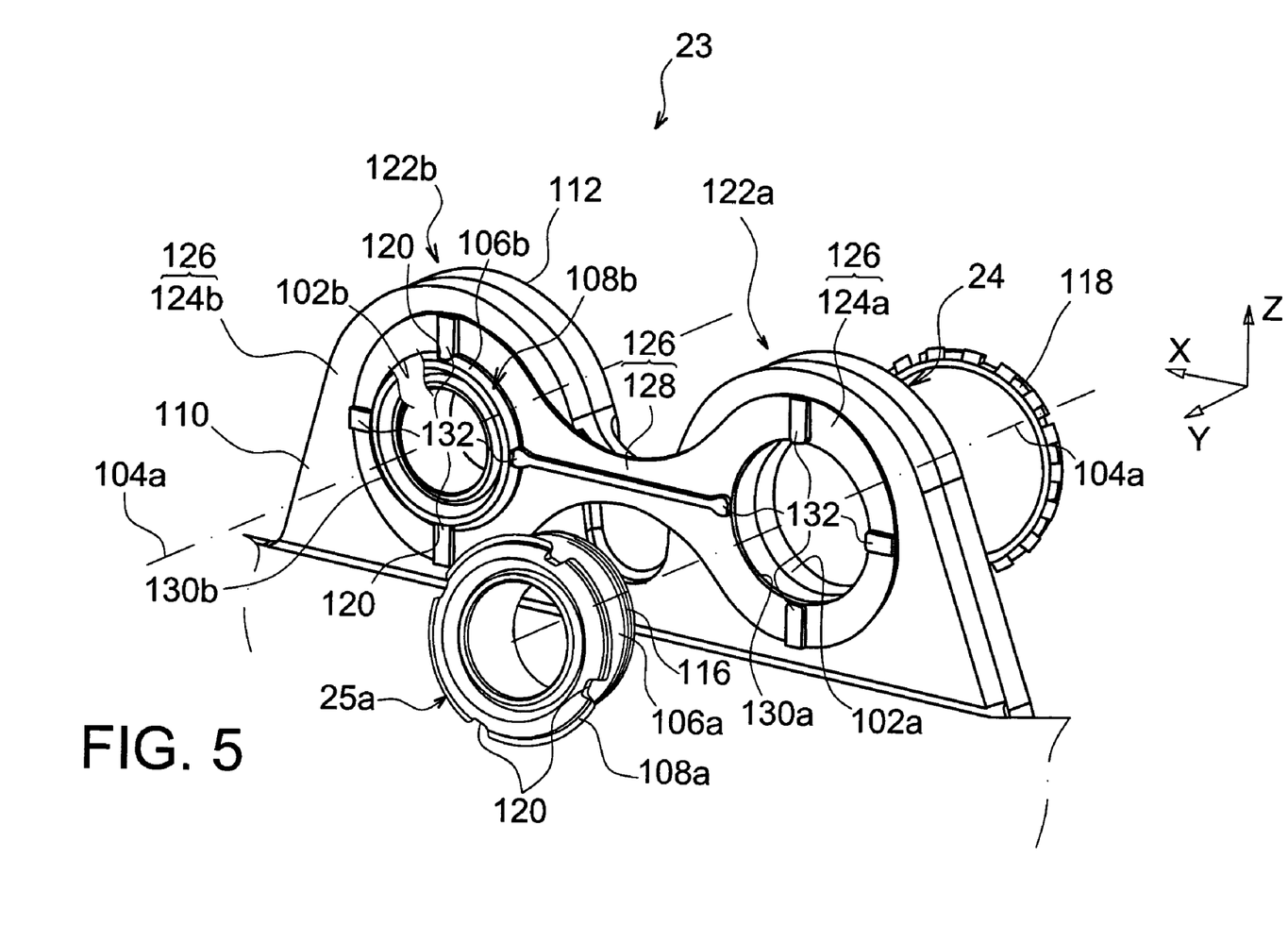
FIG. 5 represents a similar view to that illustrated in FIG. 3, the attachment arrangement being in the form of a second preferred embodiment of the present invention.

In FIG. 5 illustrating the arrangement according to a second preferred embodiment of the present invention, the parts with the same numeric reference as in the previous figures correspond to identical or similar parts.

In this way, it can be seen that a single part 126 is still provided to form both anti-rotation systems 122a, 122b with tappets 132, the only noteworthy difference with the part 126 of the first preferred embodiment lying in the design of said tappets 132. In fact, the tappets 132 comprised by the main plates 124a, 124b are no longer designed so as to protrude radially inwards in the plate orifices 130a, 130b, but so as to protrude from an external surface (not referenced) of the main plate concerned, said external surface being opposite an internal surface (not referenced) pressing against the perforated fitting 24.

This configuration is provided for due to the fact that the part 126 is assembled with the fitting 24 by pinching the main plate 124a between the shoulder 106a and the external lateral surface 110 of said perforated fitting 24, and by pinching the main plate 124b between the shoulder 106b and the external lateral surface 110 of the perforated fitting 24. As a result, it is no longer necessary to provide for assembly means 134 as described in the first preferred embodiment.

It is specified that while the tappets 132 are preferentially produced from the external surface of the plates 124a, 124b without entering the inside the plate orifices 130a, 130b, they are nevertheless provided sufficiently close to these orifices 130a, 130b such that, during the insertion of the ball joints 25a, 25b in the orifices 102a, 102b, an automatic engagement of the tappets 132 is obtained in their respective notches 120 provided on the shoulder 106a, 106b of the external ring concerned. In this respect, it is noted that the insertion is completed when said shoulder 106a, 106b makes contact with the external surface of the part 126, given that the pinching required for same no longer results in the shoulder 106a, 106b being brought into contact with the external lateral surface 110 of the fitting 24.

Finally, as can be seen in FIG. 5, it is possible to provide for two tappets 132 belonging respectively to both anti-rotation systems 122a, 122b being incorporated in the same rib, therefore passing through the intermediate portion 128. The rib obtained in this way, extending substantially along the direction X, is used to stiffen the intermediate portion 128 and therefore reduce the overall thickness of the part 126, which may then be lowered to approximately 1.5 mm.

Figure 6:
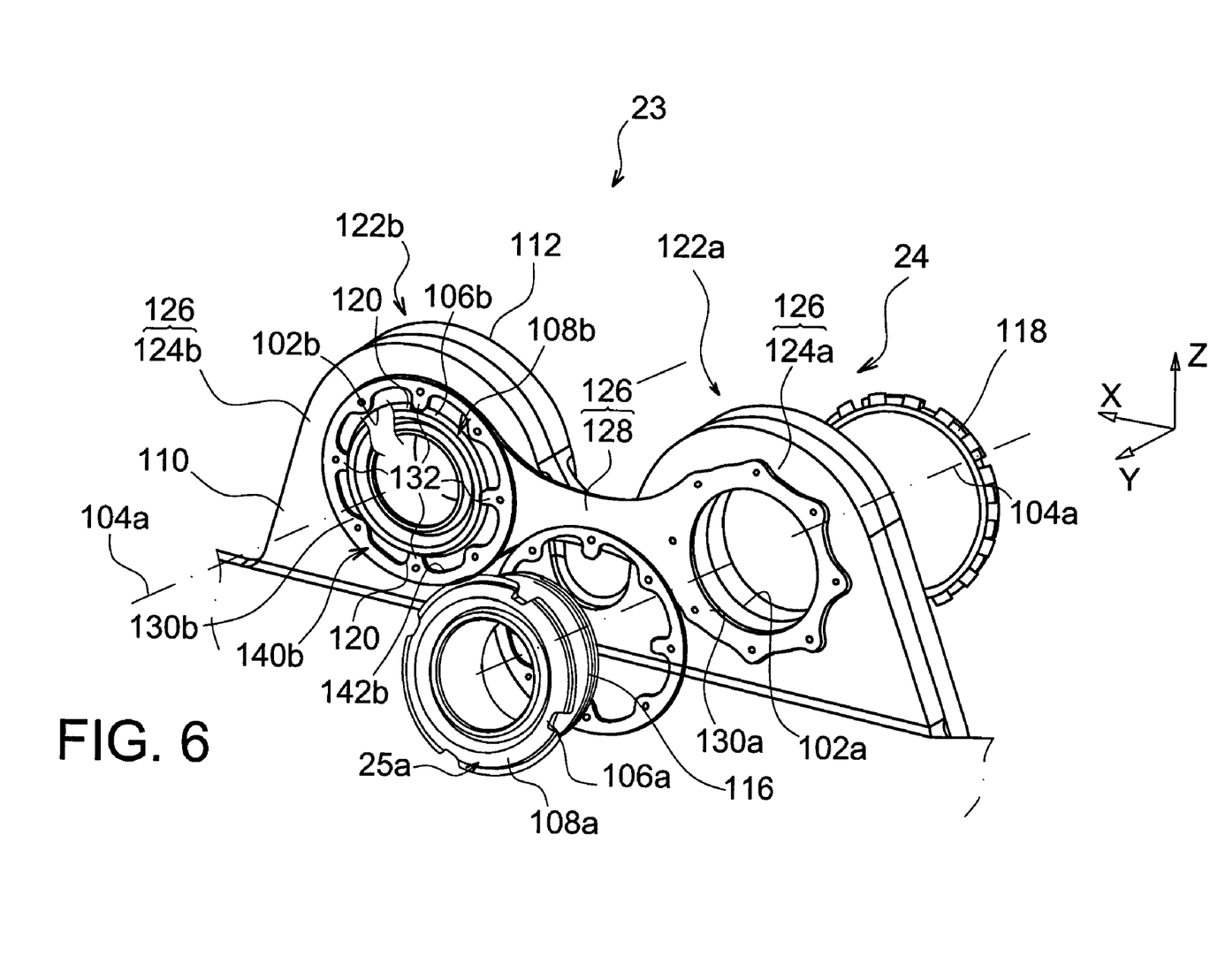
FIG. 6 represents a similar view to that illustrated in FIG. 3, the attachment arrangement being in the form of a third preferred embodiment of the present invention.

In FIG. 6, illustrating the arrangement according to a third preferred embodiment of the present invention, the parts with the same numeric references as in the previous figures correspond to identical or similar parts.

In this way, it can be seen that a part 126 consisting of one piece is still provided to form the main plates 124a, 124b of the two anti-rotation systems 122a, 122b, one of the noteworthy differences with the part 126 of the previous preferred embodiments lying in the fact that these plates 124a, 124b no longer incorporate the tappets 132 in a single part.

In fact, the first system 122a also comprises a secondary plate 140a pressing against the external surface of the main plate 124a, and assembled therewith using conventional means such as rivets. This plate 140a, also located substantially in a plane XZ, comprises a secondary plate orifice 142a centred on the axis 104a and traversed by the external ring 108a of the ball joint 25a. In addition, this plate of a substantially circular shape and of a thickness of approximately 2 mm is preferentially made of titanium. Therefore, in this third embodiment, the specificity consists of providing for said secondary plate 140a comprising tappets 132 each cooperating with one of the notches 120 provided on the external ring 108a. More specifically, the four tappets 140a consist of one piece with same, and are arranged so as to be spaced circumferentially with respect to each other around the orifice 142a wherein they protrude, radially inwards.

Similarly, the second system 122b also comprises a secondary plate 140b pressing against the external surface of the main plate 124b, and assembled therewith using conventional means such as rivets. This plate 140b, also located substantially in a plane XZ, comprises a secondary plate orifice 142b centred on the axis 104b and traversed by the external ring 108b of the ball joint 25b. In addition, this plate of a substantially circular shape and of a thickness of approximately 2 mm is preferentially made of titanium. Here again, the secondary plate 140b comprises tappets 132 each cooperating with one of the notches 120 provided on the external ring 108a, the four tappets 132 comprised by the plate 140a consisting of one piece therewith, and arranged so as to be spaced circumferentially with respect to each other around the orifice 142b wherein they protrude, radially inwards.

In this way, in this third preferred embodiment, the tappets 132 are still comprised by the main plates 124a, 124b, but consist of a single part with their respective secondary plates 140a, 140b wherein the orifices 142a, 142b are traversed by the shoulders 106a, 106b coming to a stop against the external surface of the part 126.

In fact, here again, it is ensured that the part 126 comprising in a fixed manner the two secondary plates 140a, 140b equipped with tappets 132 is itself assembled with the fitting 24 by pinching the main plate 124a between the shoulder 106a and the external lateral surface 110 of said perforated fitting 24, and by pinching the main plate 124b between the shoulder 106b and the external lateral surface 110 of the perforated fitting 24.

As a result, in this case, it is no longer necessary to provide for the assembly means 134 as described in the first preferred embodiment, which particularly makes it possible to reduce the assembly time and costs of the attachment arrangement 23.

In the three preferred embodiments described above, the two anti-rotation systems 122a, 122b are arranged on the shoulder side 106a, 106b of the external rings of the ball joints 108a, 108b.

In a fourth preferred embodiment, the two anti-rotation systems 122a, 122b are arranged on the side opposite the shoulder side 106a, 106b, i.e. on the threaded side of said external rings of the ball joints 108a, 108b, cooperating with the nuts 118.

Figure 7:
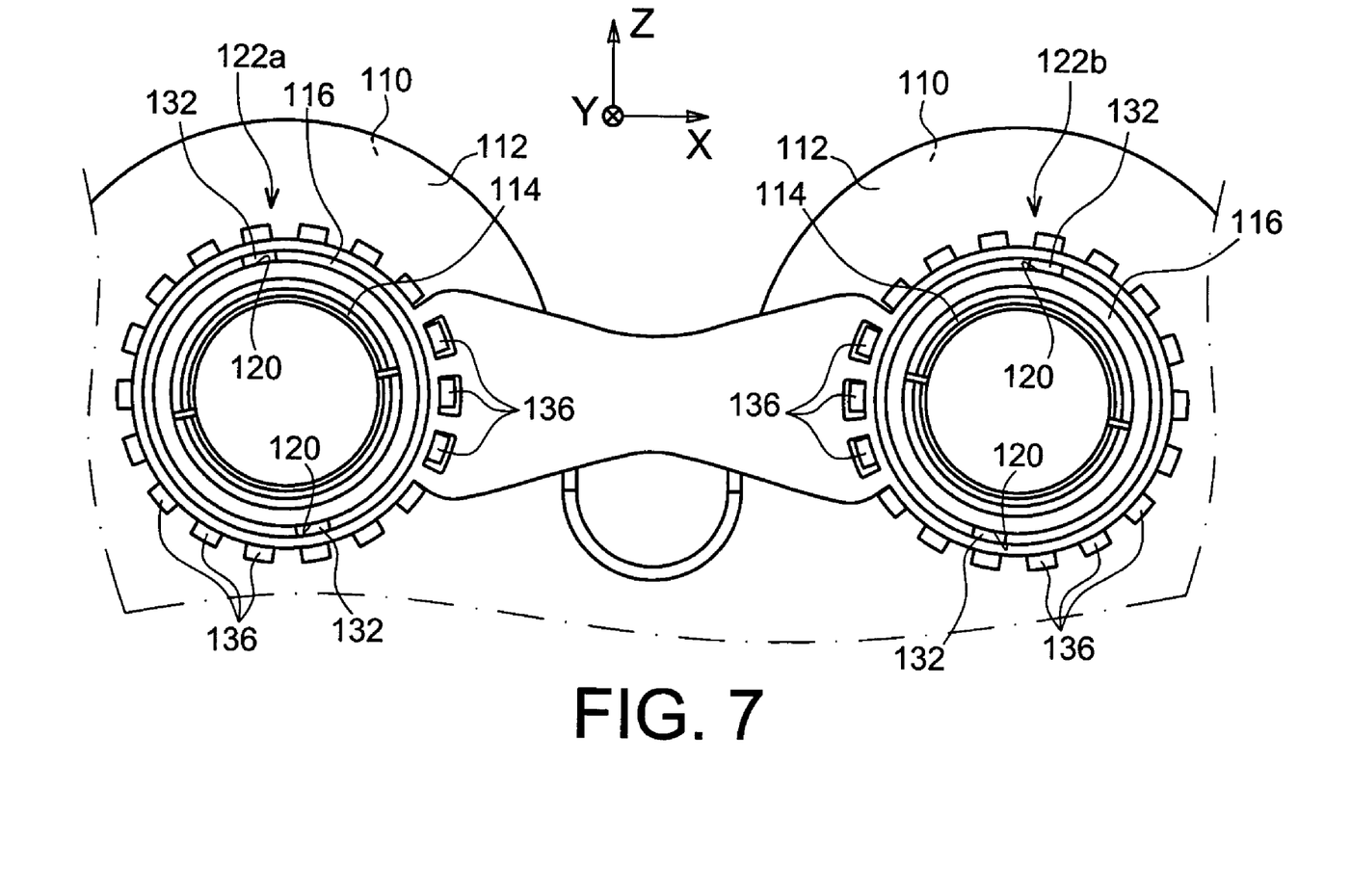
FIGS. 7 and 8 represent respectively partially exploded side and perspective views, similar to those illustrated in FIG. 3, the attachment arrangement being in the form of a fourth preferred embodiment of the present invention.
Figure 8:
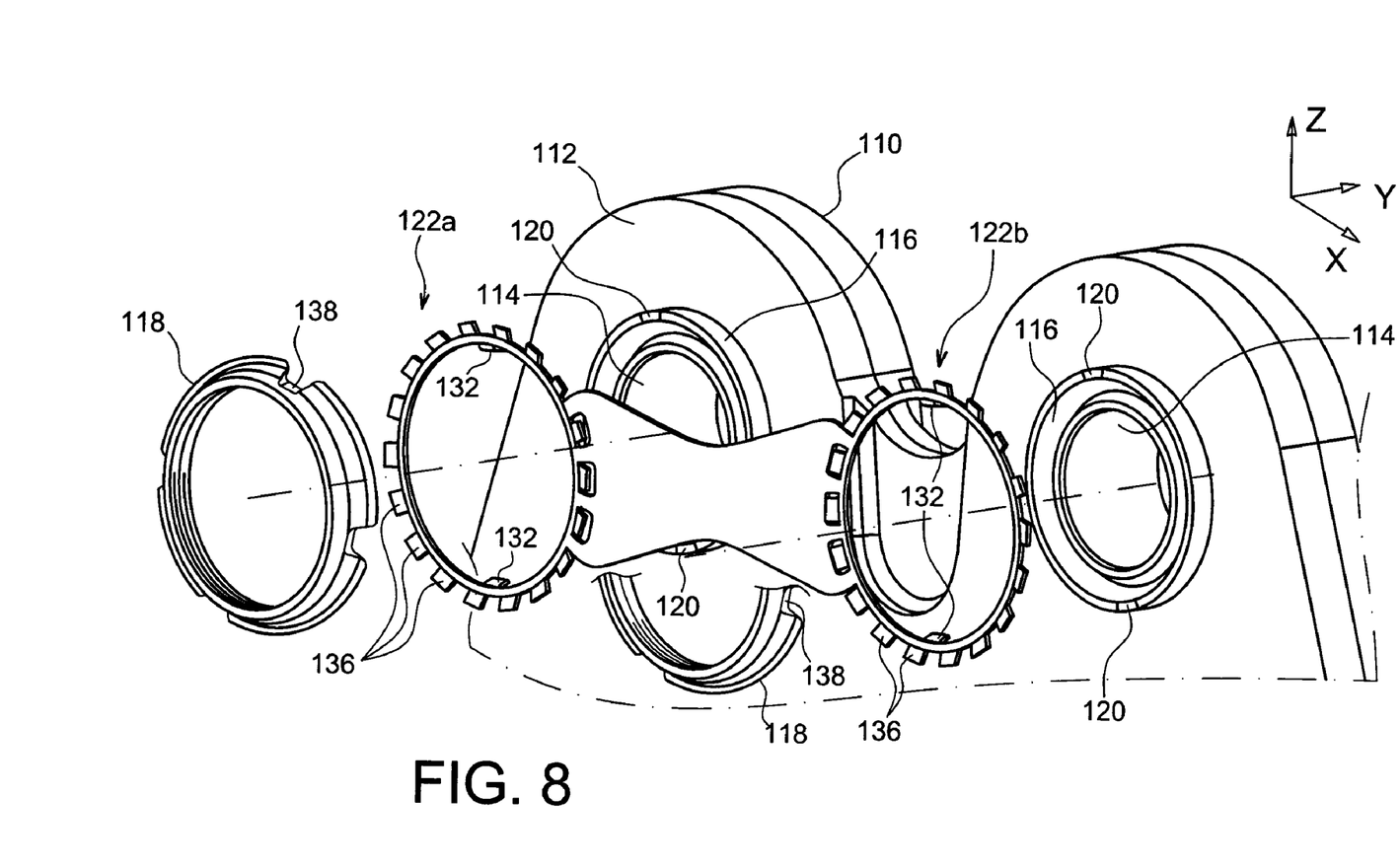

With reference to FIGS. 7 and 8 illustrating this fourth embodiment, it can be seen that the two anti-rotation systems 122a, 122b are provided in a part 126 consisting of one piece incorporating the two plates 124a, 124b, their tappets 132, and the intermediate joining portion 128, said part taking roughly the shape of a figure of eight along the direction X, pressing against the external lateral surface 110 of the fitting 24. In this way, this part 128 has a design similar to that illustrated in the first preferred embodiment. One of the specificities lies in the fact that it is held in place with respect to the perforated fitting 24 by pinching between the surface 112 of said fitting 24, and the two clamping nuts 118 (only shown in FIG. 8).

More specifically, the main plates 124a, 124b of the first and second anti-rotation systems 122a, 122b are each pinched between the surface 112 of the fitting 24, and one of the two clamping nuts 118.

Moreover, as can be seen clearly in FIGS. 7 and 8, in fact, it is ensured that the tappets 132 comprised by the main plate 124a of the first anti-rotation system 122a are spaced circumferentially with respect to each other around the main plate orifice 130a inside which they protrude, and that the tappets 132 comprised by the main plate 124b of the second anti-rotation system 122b are spaced circumferentially with respect to each other around the main plate orifice 130b inside which they protrude. In such a case, said tappets 132 cooperate with notches 120 provided on the threaded portion 116 of the external rings 108a, 108b, in the same way as that encountered with the shoulders in the first preferred embodiment described above.

Preferentially, the main plate 124a of the first anti-rotation system 122a comprises additional tappets 136 spaced circumferentially with respect to each other around the main plate orifice 130a from which they protrude radially outwards, said tappets 136 being intended to cooperate with notches 138 provided on the associated clamping nut in order to lock it in rotation. Similarly, the main plate 124b of the second anti-rotation system 122b also comprises additional tappets 136 spaced circumferentially with respect to each other around the main plate orifice 130b from which they protrude radially outwards, said tappets 136 also being intended to cooperate with notches 138 provided on the associated clamping nut in order to lock it in rotation.

Naturally, said tappets 136 may also consist of one piece with the part 126 held in position only by pinching, which is then solely capable ensuring the locking in rotation of the two external ball joint rings, and the prevention of loosening of the two nuts.

Naturally, various modifications may be made for those skilled in the art to the invention described above, as non-limitative examples only. In this respect, it is particularly possible to specify whether the engine assembly 3 is in a suitable configuration for it to be suspended under the aircraft wing unit, this assembly 3 could also come in the form of a different configuration enabling it to be mounted above said wing unit, or on a rear part of the fuselage of said aircraft.

Moreover, while all the triangular shackles 30 and 32 of the mounting device 1 have been described as extending vertically upwards, from one of their bases to the vertex opposite said base, said triangular shackles of the device may alternatively still extend vertically, but from one of their bases to the vertex opposite said base downwards. In such a case, the attachment arrangement according to the present invention is no longer on the lower fitting 24 as presented above, but on the upper fittings 44, 54 modified so as to comprise two orifices of substantially parallel axes for the assembly of the base of the triangular shackles 30, 32.

The invention claimed is:

1. An aircraft engine mounting device attachment arrangement comprising a fitting perforated with a first and a second orifice with substantially parallel axes, and a first and a second ball joint respectively housed in the first and second orifices, wherein the arrangement also comprises a first and a second anti-rotation system to lock said first and second ball joints in their respective orifices, said first anti-rotation system comprising a main plate traversed by an external ring of said first ball joint and comprising tappets cooperating with notches provided on said external ring of said first ball joint, said second anti-rotation system comprising said main plate traversed by an external ring of said second ball joint and comprising tappets cooperating with notches provided on said external ring of said second ball joint, and said first and second anti-rotation systems are connected rigidly to each other by said main plate.

2. The attachment arrangement according to claim 1, wherein said main plate of the first and second anti-rotation systems consists of one part.

3. The attachment arrangement according to claim 1, wherein said main plate of the first and second anti-rotation systems presses against said perforated fitting, and are arranged in the same plane.

4. The attachment arrangement according to claim 1, wherein the tappets comprised by the main plate of said first anti-rotation system consist of one part with said main plate, and wherein the tappets comprised by the main plate of said second anti-rotation system consist of one part with said main plate.

5. The attachment arrangement according to claim 4, further comprising means for assembling said main plates on said perforated fitting.

6. The attachment arrangement according to claim 4, wherein the tappets comprised by the main plate of said first anti-rotation system are spaced circumferentially with respect to each other around a first main plate orifice inside which said tappets protrude, and wherein the tappets comprised by the main plate of said second anti-rotation system are spaced circumferentially with respect to each other around a second main plate orifice inside which said tappets protrude.

7. The attachment arrangement according to claim 4, wherein the main plate of said first anti-rotation system is pinched between a shoulder of the external ring of said first ball joint and said perforated fitting, and wherein the main plate of said second anti-rotation system is pinched between a shoulder of the external ring of said second ball joint and said perforated fitting.

8. The attachment arrangement according to claim 7, wherein the tappets comprised by the main plate of said first anti-rotation system are spaced circumferentially with respect to each other around a first main plate orifice, and protrude from an external surface of said main plate opposite an internal surface of same pressing against the perforated fitting, and wherein the tappets comprised by the main plate of said second anti-rotation system are spaced circumferentially with respect to each other around a second main plate orifice, and protrude from an external surface of said main plate opposite an internal surface of same pressing against the perforated fitting.

9. The attachment arrangement according to claim 3, wherein said first anti-rotation system also comprises a first secondary plate mounted in a fixed manner on said main plate, the tappets consisting of one part with said first secondary plate and spaced circumferentially with respect to each other around a first secondary plate orifice inside which said tappets protrude, and wherein said second anti-rotation system also comprises a second secondary plate mounted in a fixed manner on said main plate, the tappets consisting of one part with the said second secondary plate and spaced circumferentially with respect to each other around a second secondary plate orifice inside which said tappets protrude.

10. The attachment arrangement according to claim 9, wherein the main plate of said first anti-rotation system is pinched between a shoulder of the external ring of said first ball joint and said perforated fitting, and the main plate of said second anti-rotation system is pinched between a shoulder of the external ring of said second ball joint and said perforated fitting.

11. The attachment arrangement according to claim 1, wherein each of the first and second ball joints comprises an external ring equipped with a shoulder at one of its ends and a thread cooperating with a clamping nut at the other end, and wherein said first and second anti-rotation systems cooperate respectively with the shoulder of their associated ball joint.

12. The attachment arrangement according to claim 1, wherein each of the first and second ball joints comprises an external ring equipped with a shoulder at one of its ends and a thread cooperating with a clamping nut at the other end, and wherein said main plate of the first and second anti-rotation systems is pinched between said fitting and one of the clamping nuts.

13. The attachment arrangement according to claim 12, wherein the tappets comprised by the main plate of said first anti-rotation system are spaced circumferentially with respect to each other around a first main plate orifice inside which said tappets protrude, and wherein the tappets comprised by the main plate of said second anti-rotation system are spaced circumferentially with respect to each other around a second main plate orifice inside which said tappets protrude.

14. The attachment arrangement according to claim 13, wherein the main plate of said first anti-rotation system comprises additional tappets spaced circumferentially with respect to each other around the first main plate orifice from which said additional tappets protrude radially outwards, and wherein the main plate of said second anti-rotation system comprises additional tappets spaced circumferentially with respect to the each other around the second main plate orifice from which said additional tappets protrude radially outwards, said additional tappets cooperating respectively with notches provided on the clamping nuts in order to lock same in rotation.

15. A mounting device of an engine on an aircraft structure, said device comprising a rigid structure and mounting means for mounting said rigid structure on the structure, said mounting means comprising a plurality of attachments wherein at least one comprises at least one arrangement according to claim 1.

16. A mounting device according to claim 15, wherein said at least one attachment comprises at least one arrangement and also comprises at least one triangular shackle mounted on said arrangement, via two shafts passing through the first and second ball joints respectively.

17. An engine assembly comprising an engine and a mounting device of the engine, wherein said mounting device is a device according to claim 16.

18. An aircraft comprising at least one engine assembly according to claim 17, assembled on a wing or on a rear part of the fuselage of said aircraft.

* * * * *